(12) United States Patent  (10) Patent No.: US 9,180,528 B2
Scheid et al.  (45) Date of Patent: Nov. 10, 2015

(54) EXTRACTION DEVICE AND METHOD

(71) Applicants: Eric Scheid, Bloomington, IN (US);
 Colt Miller, Bloomington, IN (US);
 Brad Moan, Greenwood, IN (US)

(72) Inventors: Eric Scheid, Bloomington, IN (US);
 Colt Miller, Bloomington, IN (US);
 Brad Moan, Greenwood, IN (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 277 days.

(21) Appl. No.: 13/627,510

(22) Filed: Sep. 26, 2012

(65) Prior Publication Data

US 2013/0081518 A1  Apr. 4, 2013

Related U.S. Application Data

(60) Provisional application No. 61/626,666, filed on Sep. 30, 2011.

(51) Int. Cl.
 *B25B 27/18* (2006.01)
 *B25B 13/50* (2006.01)
 *B23B 47/00* (2006.01)
 *B28D 1/14* (2006.01)

(52) U.S. Cl.
 CPC ............... *B23B 47/00* (2013.01); *B28D 1/146* (2013.01); *B23B 2226/75* (2013.01); *B23B 2260/078* (2013.01)

(58) Field of Classification Search
 CPC ...... B25B 13/04; B25B 13/06; B25B 13/065; B25B 13/44; B25B 13/48; B25B 13/50; B25B 23/0035; B25B 31/005; B23B 47/00; B23B 2260/078; B23B 2226/75; B28D 1/146
 USPC .............. 81/58.1, 176.1–176.2, 124.3, 124.7, 81/177.5
 See application file for complete search history.

(56) References Cited

U.S. PATENT DOCUMENTS

| RE203 | E | * | 6/1851 | Larkin | 81/28 |
|---|---|---|---|---|---|
| 339,544 | A | * | 4/1886 | Graham | 408/226 |
| 3,695,124 | A | * | 10/1972 | Myers | 81/124.3 |
| 3,908,489 | A | * | 9/1975 | Yamamoto et al. | 81/124.3 |
| 4,905,547 | A | * | 3/1990 | Nigrelli | 81/176.15 |
| 5,286,145 | A | * | 2/1994 | Kleine | 408/226 |

* cited by examiner

*Primary Examiner* — Hadi Shakeri
(74) *Attorney, Agent, or Firm* — Christopher A. Monsey (57) ABSTRACT

A stuck drill bit having a KCS shank can be removed using an article with a body structure. The body structure has an opening that fits onto the shank, and an inward-facing surface around the opening is at least partially complementary to the surface of the shank. The surfaces engage sufficiently that rotary manual force is transferred from the inward-facing surface to the surface of the shank.

3 Claims, 11 Drawing Sheets

EXTRACTION DEVICE AND METHOD

CROSS-REFERENCE TO RELATED APPLICATIONS

The present application claims priority to U.S. Provisional Patent Application Ser. No. 61/626,666, filed Sep. 30, 2011, entitled "EXTRACTION DEVICE AND METHOD," the disclosure of which is expressly incorporated by reference herein.

STATEMENT REGARDING FEDERALLY SPONSORED RESEARCH OR DEVELOPMENT

The invention described herein was made in the performance of official duties by employees of the Department of the Navy and may be manufactured, used, or licensed by or for the United States Government for any governmental purpose without payment of any royalties thereon.

BACKGROUND

Various methods and apparatus are known for producing holes in durable material. Among these, rotary drills and hammer drills employ drill bits that include cutting and/or breaking surfaces arranged to remove a portion of the substrate material as the drill bit is advanced. In certain drill bits, one or more helical features, such as helical grooves or channels, serve to withdraw the removed substrate material away from the cutting and/or breaking surfaces. In some cases, the helical features extend over much of the length of the drill bit so that removed material is extracted out of the substrate material altogether.

SUMMARY

The present inventors have considered the operation of various drill bits and drilling apparatus. From this effort they have concluded that improvements are possible over existing methods and apparatus and arrived at the presently disclosed inventions.

Among the improvements identified by the inventors, are improvements related to the extraction of a drill bit that has become stuck in a substrate being drilled. In particular, they invented apparatus and methods related to a keyed clamping system. The term keyed clamping system (KCS) refers to drill chuck and drill bit having a clamping system which could include spring-loaded keyed chuck that receives a KCS drill bit shank, so that bits can be inserted and retained in place by a sequence of insertion/manipulation of the drill bit shank and drill chuck.

Many drills that employ KCS do not include a reverse rotation mode. The absence of a reversing mode may reflect efforts to lower the weight and/or cost of the drill. In any event, removal of a stuck drill can be difficult where a drill reversal mode is not available. Conventionally, when subject drill bits have become stuck in a substrate being drilled, users have attempted to extract drills using a pipe wrench or locking pliers.

Inventions described herein can be embodied, for example, in articles of manufacture and methods in which a body structure or substructure has an opening that fits onto an keyed clamping system (KCS) drill bit shank or other KCS drill bit shank, and the inward-facing surface around the opening is at least partially complementary to the shank's surface. If the two surfaces are sufficiently engaged, the body structure can be manually rotated to turn the drill bit, such as to turn it out of a hole in which it is stuck.

DETAILED DESCRIPTION

In certain conventional drilling equipment and processes, it is possible for a drill bit to become stuck in a substrate material preventing additional drilling progress and making extraction difficult. Particularly in cases where the drilling equipment does not offer a reverse rotation mode, removal of the drill bit can be problematic. The present invention offers an effective alternative to abandonment of the drill bit in the hole, and to ad hoc removal methods.

As a general rule, rotary drilling and hammer drilling is accomplished using apparatus that includes an actuating portion and a discrete cutting portion. The actuating portion is generally referred to as the "drill" and the cutting portion is referred to as the "drill bit." The drill generally includes a device referred to as a "chuck" which is adapted to operatively couple the drill bit to the drill. The drill includes a motor for converting energy (typically received as electrical current, compressed gas or pressurized hydraulic fluid) into rotary and/or linear motion. This motion is coupled to the chuck, and thereafter into the drill bit. The motion of the drill bit relative to an underlying substrate results in a desired boring action.

Traditional chucks employ strong radial forces applied against a circumferential surface of a drill bit shank to effectively couple forces from the drill to the drill bit. Other chucks have been developed including keyed clamping systems.

As noted above, the term keyed clamping system (KCS) refers to a drill chuck and drill bit having at least one axial slot (the term "slot" is used to encompass closely related terms such as "groove" and "indentation"). A corresponding protrusion is adapted to be disposed within the slot. The protrusion acts as a key to convey torque between the chuck and the drill bit and/or to retain the drill bit within the chuck.

Figure 1:
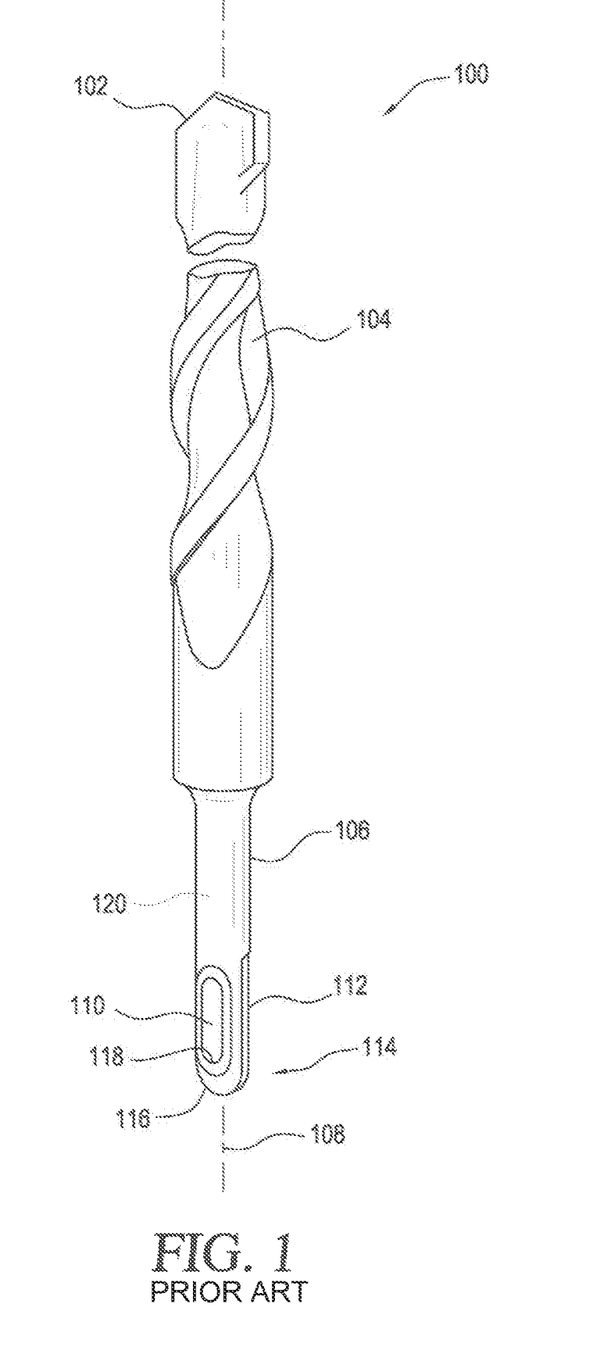
FIG. 1 shows a portion of an exemplary drill bit including a KCS shanks.

FIG. 1 shows a portion of an exemplary KCS drill bit. The drill bit includes a cutting surface 102 a helical extraction portion 104 and a shank portion 106. The drill bit defines a longitudinal axis 108. Two slots 110, 112 are visible in the shank 106. The slots, 110, 112, have respective longitudinal axes disposed substantially parallel to the longitudinal axis 108 of the drill bit. Slot 112 is open 114 to a proximal end 116 of the drill bit 100. In contrast, slot 110 includes a proximal surface 118, and is consequently closed to end 116 of the drill bit. A circumferential surface region 120 of the illustrated drill bit shank 106 defines a generally circular cross-section taken perpendicular to longitudinal axis 108.

Figure 2A:
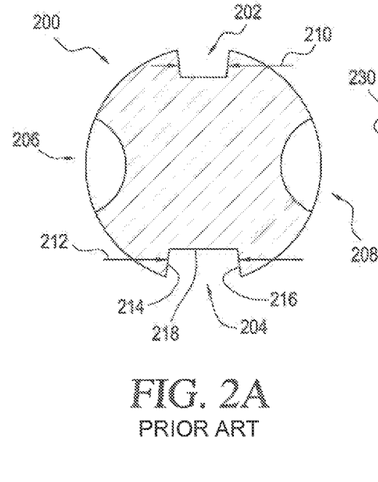
FIG. 2A-2D shows exemplary cross-sections of various KCS style drill bit shanks.

FIGS. 2A-2D show various exemplary cross-sections for respective KCS drill bit shanks. The illustrated cross-sections, are viewed from distal to proximal on a longitudinal axis of the drill bit. Thus, FIG. 2A shows a cross-section 200 of a shank with first 202 and second 204, third 206 and forth 208 slots. Slots 202 and 204 are open-ended slots (i.e., they are open to the proximal end of the drill bit shank). Slots 206 and 208 are closed-ended slots. Slot 202 has a width 210 and slot 204 has a width 212. In the illustrated embodiment, widths 210 and 212 are substantially different from one another such that width 212 is larger than width 210. Slot 204, for example, is defined by side surface regions 214 and 216, and by a bottom surface region 218. In the illustrated example, side surface regions 214 and 216 are disposed in substantially parallel spaced relation to one another, and generally normal to bottom surface region 218.

Figure 2B:
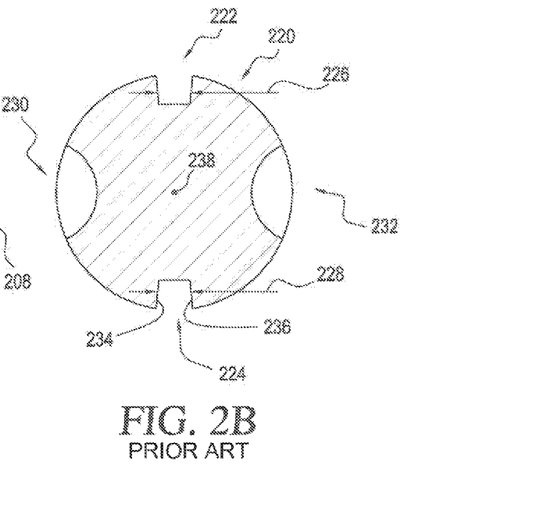

FIG. 2B shows a cross-section 220 of a further KCS drill bit shank. As noted above, cross-section 220 is viewed from distal to proximal. Cross-section 220 includes first and second open-ended slots 222, 224 with respective widths 226 and 228. As illustrated, widths 226 and 228 are substantially equal to one another. Cross-section 220 also shows that the corresponding KCS drill bit shank includes first 230 and second 232 closed-ended slots. The open-ended slots are disposed diametrically across from one another, as are the closed-ended slots. Exemplary slot surface regions 234 and 236 are disposed in spaced relation to one another. In some embodiments, the surface regions 234 and 236 are disposed substantially parallel to one another. In other embodiments, surface regions 230 and 232 are disposed obliquely with respect to one another. In still other embodiments, obliquely disposed surface regions 234 and 236 are disposed substantially radially with respect to a centerpoint 238 of cross-section 220.

Figure 2C:
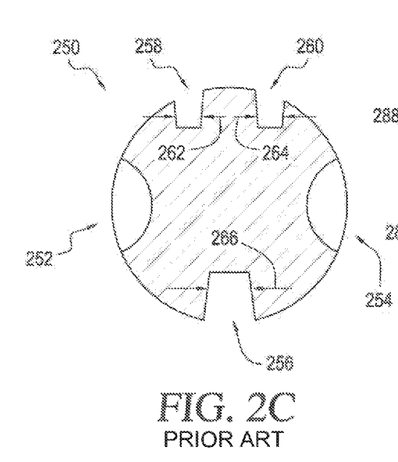

FIG. 2C shows still another exemplary cross-section 250 of a KCS drill bit shank. Cross-section 250 includes first 252 and second 254 closed-ended slots. Cross-section 250 also includes first 256, second 258 and third, 260 open-ended slots. While close-ended slots 252 and 254 are disposed diametrically opposite one another, open-ended slots 256, 258 and 260 are offset from one another respectively. Also, as exemplified in FIG. 2C the respective widths 262, 264 of slots 258 and 260 are substantially identical, whereas the width 266 of slot 256 is wider than the width 262 of slot 258.

Figure 2D:
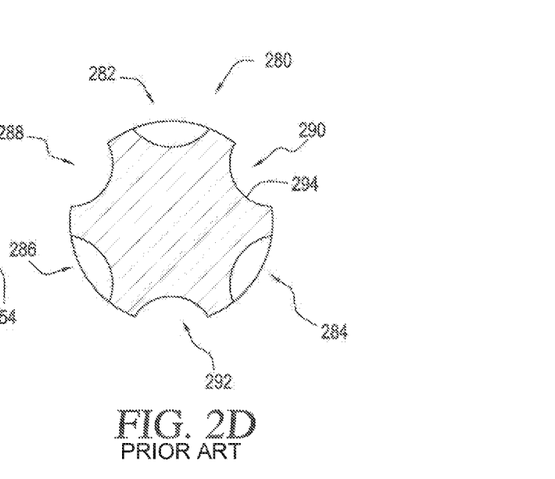

FIG. 2D shows another cross-section 280 of a KCS drill bit shank. Cross-section 280 shows three closed-ended slots 282, 284 and 286. Also illustrated are three open-ended slots 288, 290 and 292. It is worth noting that, unlike the previously illustrated open-ended slots, the open-ended slots of cross-section 280 include smoothly curving side regions, e.g., 294. This contrasts with, for example, the side 214, 216 and bottom 218 regions of slot 204 shown in FIG. 2A.

The practitioner of ordinary skill in the art, on viewing FIGS. 1-2D will understand that the indicated arrangements and cross-sections are merely illustrative of a wide variety of shank arrangements and cross-sectional profiles that are identified as KCS within the meaning of the present invention. Accordingly, a KCS drill bit shank is a drill bit shank with one or more slots that have a least a region extending parallel to the axis around which the drill bit rotates when turned by a drill. Drill bits with KCS shanks can be used with drills whose chucks fit the shanks, e.g. exemplary KCS shanks fitted into chucks of KCS rotary hammer drills. In contrast, slotless shanks are not KCS shanks as that term is used herein.

A KCS chuck may include a spring-loaded key so that bits can be inserted and retained in place by a sequence of insertion/manipulation of the drill bit shank and drill chuck. These manipulations can include rotation after insertion of the keyed shank into a spring loaded keyed drill shank receiving cavity. In some applications, a shank is slideably retained in the chuck so that it can slide back and forth along its longitudinal axis during drilling. This mobility may facilitate applications such as hammer drilling.

One embodiment of a KCS includes a rotational drive that uses sliding keyways that open to the end of a drill shank which mate with keys in the chuck. Smaller indentations in an exemplary drill shank that do not open to the shank end can be grasped by the chuck to prevent the drill bit falling out by means of spring loaded keys. In this embodiment, the hammer of the drill hits the flat end of the shank. A variety of keying arrangements can be used. To allow the bit shank to slide in the chuck, the exemplary shank can be lubricated, e.g., with grease.

Exemplary implementations described herein address problems that arise, for example, in using KCS drills and other drills with drill bits that have KCS shanks. Such drill bits are typically expensive, durable, and specially adapted for use in hammer drills or rotary hammer drills to make holes in rock, concrete, and other masonry. With irregular masonry or reinforced concrete, such a drill bit is more likely to become lodged, wedged, or otherwise stuck than when drilling homogenous materials. For example, rebar or other reinforcing material can press against the drill bit, interfering with its removal. Typically, the drill bit cannot be removed by reversing the drill's rotation direction because drills used with such drill bits often are not reversible. Therefore, when such a drill bit becomes stuck in a hole it is producing, the user cannot reverse the drill to remove the drill bit and instead must find some other approach. In such situations, the drill bit is unlikely to be damaged.

A user can often remove a stuck drill bit that has a KCS shank by attaching a pipe wrench to the shank and turning the drill bit counter-clockwise, adjusting the pipe wrench as necessary to maintain its grip on the shank. However, a pipe wrench does not fit KCS shanks properly, does not hold such shanks efficiently, and can damage such shanks or lead to user injury in various ways. Furthermore, in time-urgent situations such as in combat, use of a pipe wrench can cause delay, possibly leading to mission failure and/or extended exposure to hostile conditions.

Exemplary implementations described herein alleviate these problems with body structures or substructures that fit onto a KCS shank or a KCS shank and have inward-facing surfaces that are at least partially complementary to the outer surface of the shank. For example, an inward-facing surface could be complementary to a portion of the shank's outer surface that includes a slot or a spline. As explained in greater detail below, a tool that includes or holds such a body structure can often be quickly fitted onto a drill bit's shank and then manual force can be applied to efficiently remove the drill bit from the hole in which it is stuck.

Figure 3:
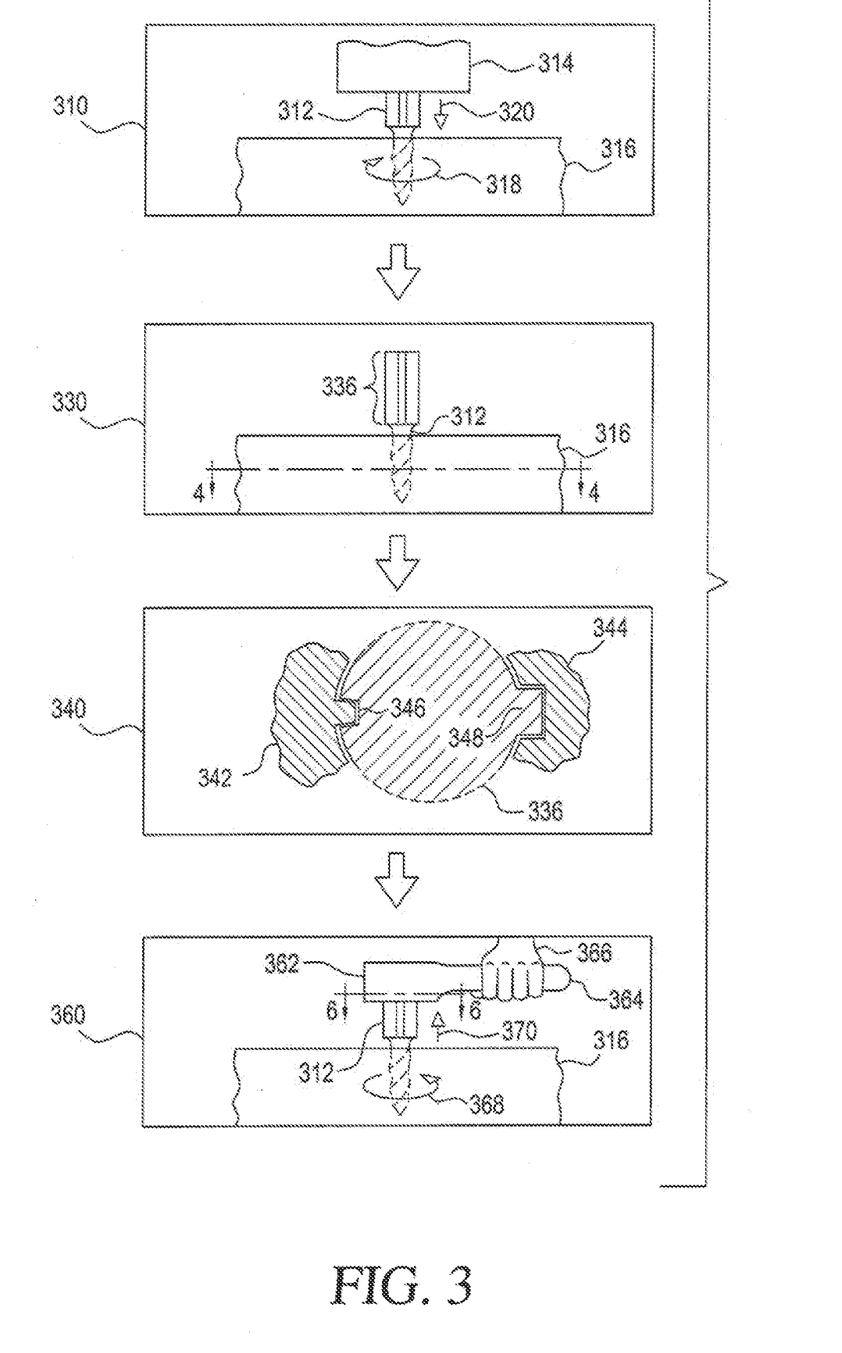
FIG. 3 is a flow diagram schematically illustrating certain stages in an exemplary implementation of removing a drill bit having a KCS shank from a hole it has drilled.

FIG. 3 shows schematically several stages in using a drill bit that has a KCS shank. In particular, some of the stages in FIG. 3 illustrate an exemplary implementation of removing such a drill bit from a hole it has drilled.

In the stage in box 310, drill bit 312 is held by drill chuck 314 of a drill (not shown) while the drill is operated to drill a hole in object 316. Object 316 can, for example, be rock, concrete, or other masonry, and the drill can, for example, be a hammer drill, rotary hammer drill, a similar drill suited for drilling materials such as rock, concrete, or other masonry, or another appropriate type of drill. As suggested by the vertical lines on the upper portion of bit 312, it has a KCS shank, and chuck 314 is structured to receive and hold the KCS shank of bit 312. As a result, operation of the drill causes bit 312 to turn in a first rotary direction, illustratively clockwise, as indicated by arrow 318, and also causes bit 312 to penetrate into object 316, as indicated by arrow 320. As a result, bit 312 produces a hole in object 316.

The stage in box 310 illustrates how a drill bit's axis of rotation provides a frame of reference. In general, terms such as "rotate", "rotation", and "rotary" refer to motion, force, or direction that is around an axis of rotation. For example, a "manual rotary force" would be a manually applied force in a direction around an axis of rotation. Unless otherwise indicated, terms such as "inward" and "outward" refer respectively to directions toward and away from an axis of rotation. Similarly, unless otherwise indicated, terms such as "longitudinal" refer to directions parallel to an axis of rotation.

In drilling into object 316, however, bit 312 may encounter irregularities or reinforcements such as rebar, which may engage bit 312 or otherwise cause it to become stuck in the hole it has produced. If the drill is not reversible, as is typical for drills that use bits with KCS shanks, it may be necessary to detach chuck 314 from bit 312 and then remove bit 312 from the hole manually. Box 330 in FIG. 3 illustrates a stage at which bit 312 is stuck in its hole and chuck 314 has been detached.

Figure 4:
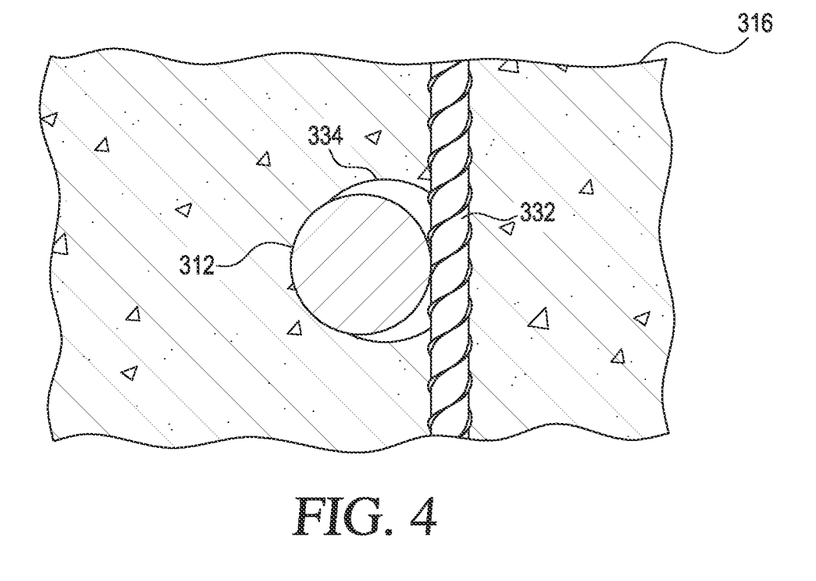
FIG. 4 is a schematic cross section of a drill bit stuck in a hole, taken along line 4-4 in FIG. 3.

The cross-section in FIG. 4, taken along line 4-4 in FIG. 3, shows an example of how bit 312 could be stuck in the hole: Object 316 is illustratively reinforced concrete containing rebar 332. Bit 312 has drilled past rebar 332, but now rebar 332 is pressing against the gap above land 334 such that bit 312 is stuck in place. In this and similar situations, it may not be possible to non-destructively remove bit 312 except by manually turning it in a direction opposite arrow 316, illustratively counterclockwise. Conventional techniques, such as attaching a pipe wrench to KCS shank 336, can damage bit 312 or cause other problems described above.

As in exemplary implementations described below, a body structure has an opening that can be fitted onto shank 336, allowing manual rotary force to be applied to cause bit 312 to turn. This stage is illustrated by the cross-section of box 340, taken along the line 6-6 in box 360. The body structure illustratively includes portions 342 and 344, each of which has an inward-facing surface that is complementary to a respective portion of the outward surface of shank 336. More specifically, the inward-facing surface of portion 342 is complementary to a portion of shank 336 that includes slot 346, with the inward-facing surface having a spline that fits into slot 346. Similarly, the inward-facing surface of portion 344 is complementary to a portion of shank 336 that includes spline 346, with the inward-facing surface having a slot that fits over spline 346. Portions 342 and 344 are two examples of how a body structure's inward-facing surface can be "at least partially complementary" to a surface of a bit's KCS shank.

Figure 5:
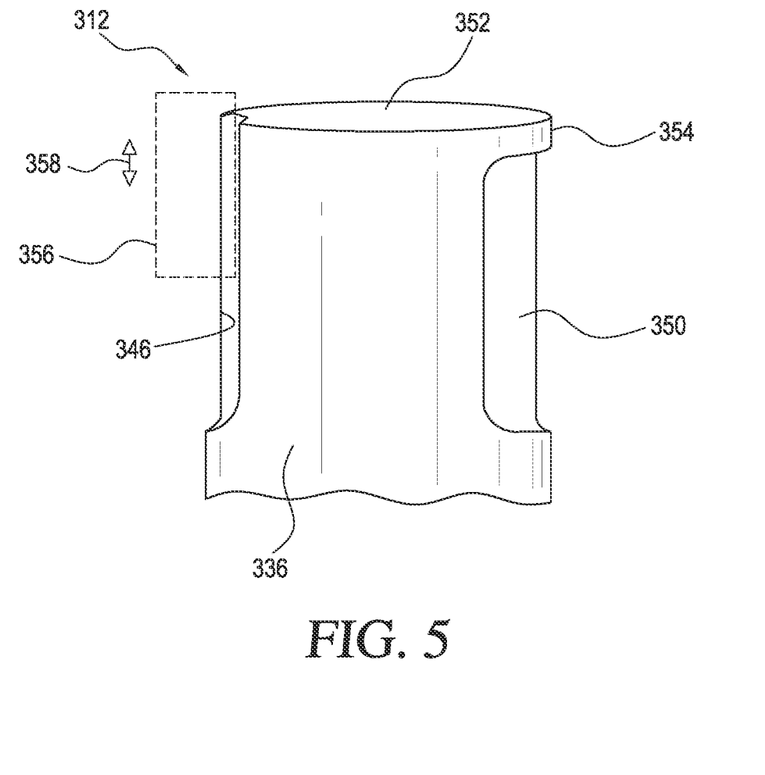
FIG. 5 is a side view of a drill bit shank illustrating open-ended and close-ended slots.

Shank 336 of drill bit 312 in FIG. 5 includes slot 346 as in box 340 in FIG. 3, and also includes slot 350; for illustrative purposes, slots 346 and 350 are shown with an offset angle of approximately 180 degrees between them. In other illustrative embodiments of the invention, offset angles between adjacent slots in actual implementations are 90 degrees or less, as in several exemplary implementations described below. Flat end 352 of shank 336 is the end of drill bit 312 that is inserted into chuck 314 and is also the end that is hammered during drill operation, e.g., during hammer drilling. Slot 346 is "open-ended", meaning that it is open to and through end 352. Slot 350, in contrast, is "close-ended", meaning that it is separated from end 352, illustratively by land 354, and therefore does not have an open end. In conventional implementations, chuck 314 includes spring-loaded balls (not shown) or other parts that fit into slots 346 and 350. The ball that fits into slot 346 can slide or roll into and out of position through end 352, but the ball that fits into slot 350 cannot slide or roll through end 352 but instead contacts land 354, and this contact helps prevent bit 312 from falling out of chuck 314 during drill operation.

Spline 356, shown in dashed line in FIG. 5, is complementary to slot 346 in the same way illustrated by the spline on portion 342 in box 340 (FIG. 3). Because slot 346 is open-ended, spline 356 can move into and out of slot 346 through end 352, as indicated by bidirectional arrows 358. As will be seen from exemplary implementations described below, a body structure's inward-facing surface can have splines that are complementary to a shank's open-ended slots while not having splines that are complementary to the shank's close-ended slots—a spline complementary to a close-ended slot would, in general, prevent the body structure from fitting onto the shank. Furthermore, in illustrative implementations described below, engagement between the body structure and all or a subset of a shank's open-ended slots is sufficient that rotary force transferred through the body structure's inward-facing surface to the shank's surface causes the drill bit to turn, e.g. to remove the drill bit from a hole in which it is stuck.

As used herein, the term "sufficiently engaged", when used to describe an inward-facing surface and a drill bit shank's surface, means that engagement between the two surfaces is sufficient that rotary force is transferred from one surface to the other, causing the two surfaces to rotate together. In a typical case with a body structure fitted onto a KCS shank, rotary force transfer occurs where a side of a slot in one surface engages a side of a spline in the other surface or vice versa, and such engagement is sometimes referred to herein as "side-to-side engagement".

In the stage illustrated in box 360 of FIG. 3, manual rotary force is applied to turn bit 312. Body structure 362 (including, e.g., portions 342 and 344) is connected to a lever arm member such as longitudinal arm 364, which is torqued by a user's hand 366. Because the inward-facing surface of body structure 352 is sufficiently engaged with the surface of shank 336, such as through one or more instances of side-to-side engagement, manual rotary force transferred from hand 366 through arm 364 to the inward-facing surface of body structure 362 causes bit 312 to turn, as indicated by arrow 368. As a result, bit 312 moves out of the hole it produced in object 316, as indicated by arrow 370.

Figure 6:
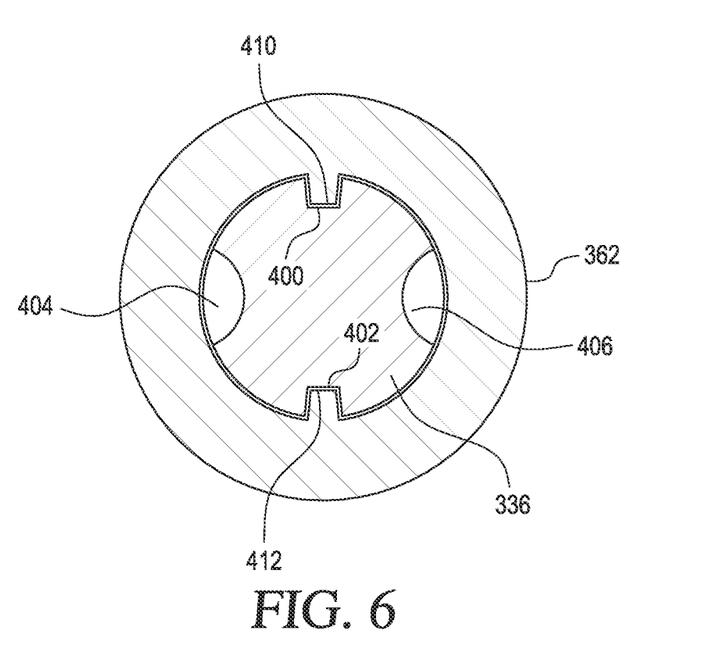
FIG. 6 is a cross-sectional view taken along line 6-6 in FIG. 3, showing an exemplary KCS drill bit shank with a body structure fitted onto it.

The cross-section in FIG. 6, taken along line 6-6 in box 360 (FIG. 3), shows body structure 362 with an opening fitted over shank 336, illustratively a KCS drill bit shank. In the illustrated example, shank 336 has open-ended slots 400 and 402 and close-ended slots 404 and 406. The inward-facing surface of the opening is completely complementary to the end of shank 336 because splines 410 and 412 are complementary to open-ended slots 400 and 402, respectively. The inward-facing surface is only partially complementary to shank 436 at the position of line 6-6 in box 360, however, because the inward-facing surface does not include portions that are complementary to close-ended slots 404 and 406.

Splines 410 and 412 have side-to-side engagement with slots 400 and 402, respectively, and the inward-facing surface is therefore sufficiently engaged with the surface of shank 336 that manual rotary force is transferred from one surface to the other. The inward-facing surface of body structure 362 could, however, be varied while maintaining sufficient engagement for transfer of manual rotary force. For example, if the inward-facing surface included only one of splines 410 and 412 and not the other, the single spline would still have side-to-side engagement with the respective open-ended slot in shank 336, and the surfaces might still be sufficiently engaged for transfer of manual rotary force. Other possible variations in body structure 362 are described below.

Figure 7:
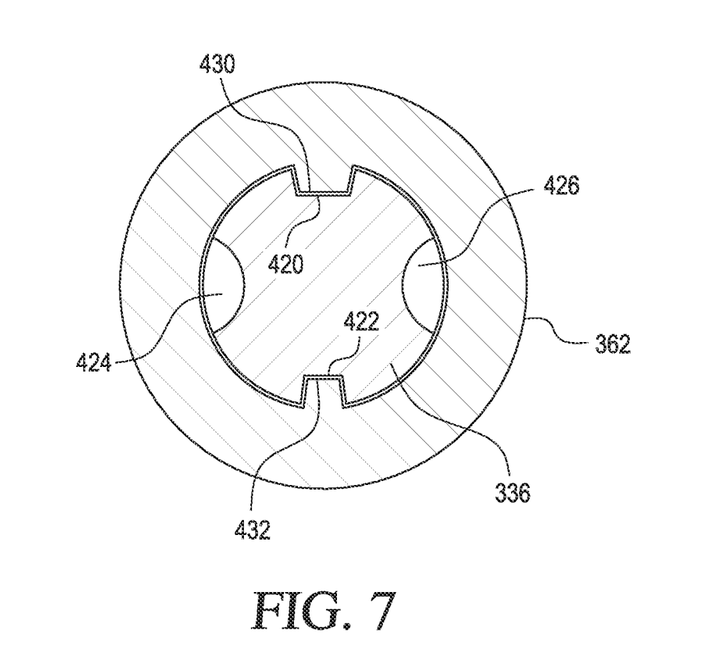
FIG. 7 is a cross-sectional view taken along line 6-6 in FIG. 3, showing another exemplary KCS-drill bit shank with a body structure fitted onto it.

The cross-section in FIG. 7, also taken along line 6-6 in box 360 (FIG. 3), similarly shows body structure 362 with an opening fitted over shank 336, but illustratively a KCS drill bit shank. In the illustrated example, shank 336 has open-ended slots 420 and 422 and close-ended slots 424 and 426. The inward-facing surface of the opening is completely complementary to the end of shank 336 because splines 430 and 432 are complementary to open-ended slots 420 and 422, respectively. The inward-facing surface is only partially complementary to shank 336 at the position of line 6-6 in box 360, however, because the inward-facing surface does not include portions that are complementary to close-ended slots 424 and 426.

Splines 430 and 432 have side-to-side engagement with slots 420 and 422, respectively, and the inward-facing surface is therefore sufficiently engaged with the surface of shank 336 that manual rotary force is transferred from one surface to the other. As in FIG. 6, however, the inward-facing surface of body structure 362 could be varied while maintaining sufficient engagement for transfer of manual rotary force. Even though open-ended slots 420 and 422 are different in width and splines 430 and 432 are similarly different in width, the inward-facing surface could include only one of splines 430 and 432 and not the other, the single spline would still have side-to-side engagement with the respective open-ended slot in shank 336 and spline 432 could have side-to-side engagement with slot 420 even though not fitting snugly into it, and the surfaces might still be sufficiently engaged for transfer of manual rotary force.

Figure 8:
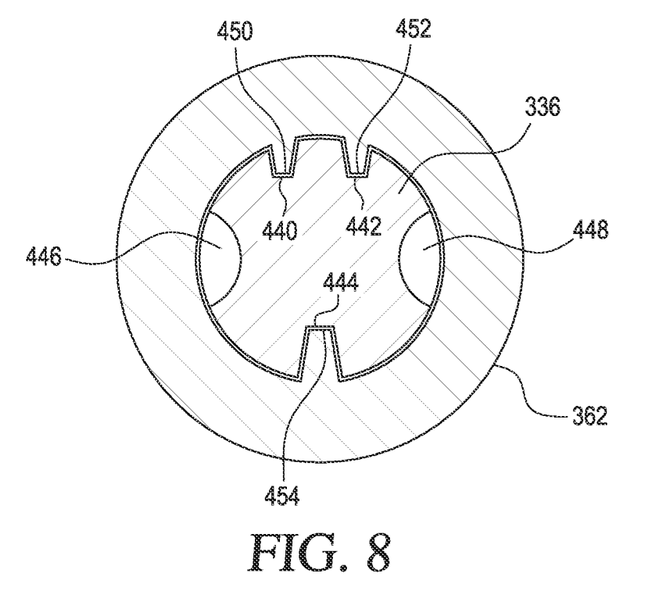
FIG. 8 is a cross-sectional view taken along line 6-6 in FIG. 3, showing another exemplary KCS drill bit shank with a body structure fitted onto it.

The cross-section in FIG. 8, also taken along line 6-6 in box 360 (FIG. 3), similarly shows body structure 362 with an opening fitted over shank 336, but illustratively a KCS drill bit shank. In the illustrated example, shank 336 has open-ended slots 440, 442, and 444 and close-ended slots 446 and 448. The inward-facing surface of the opening is completely complementary to the end of shank 336 because splines 450, 452, and 454 are complementary to open-ended slots 440, 442, and 444, respectively. The inward-facing surface is only partially complementary to shank 336 at the position of line 6-6 in box 360, however, because the inward-facing surface does not include portions that are complementary to close-ended slots 446 and 448.

Splines 450, 452, and 454 have side-to-side engagement with slots 440, 442, and 444, respectively, and the inward-facing surface is therefore sufficiently engaged with the surface of shank 336 so that manual rotary force is transferred from one surface to the other. As in FIGS. 4 and 5, however, the inward-facing surface of body structure 362 could be varied while maintaining sufficient engagement for transfer of manual rotary force. Even though open-ended slots 440 and 442 are different in width from open-ended slot 454 and splines 450 and 452 are similarly different in width from spline 454, and even though the orientations of slots 440, 442, and 444 are modified from the configurations in FIGS. 4 and 5, the inward-facing surface could include only one or two of splines 450, 452, and 454 and each remaining spline could still have side-to-side engagement with the respective open-ended slot in shank 336 or, in some cases, with another slot into which it might not fit as snugly, and the surfaces might still be sufficiently engaged for transfer of manual rotary force.

Figure 9:
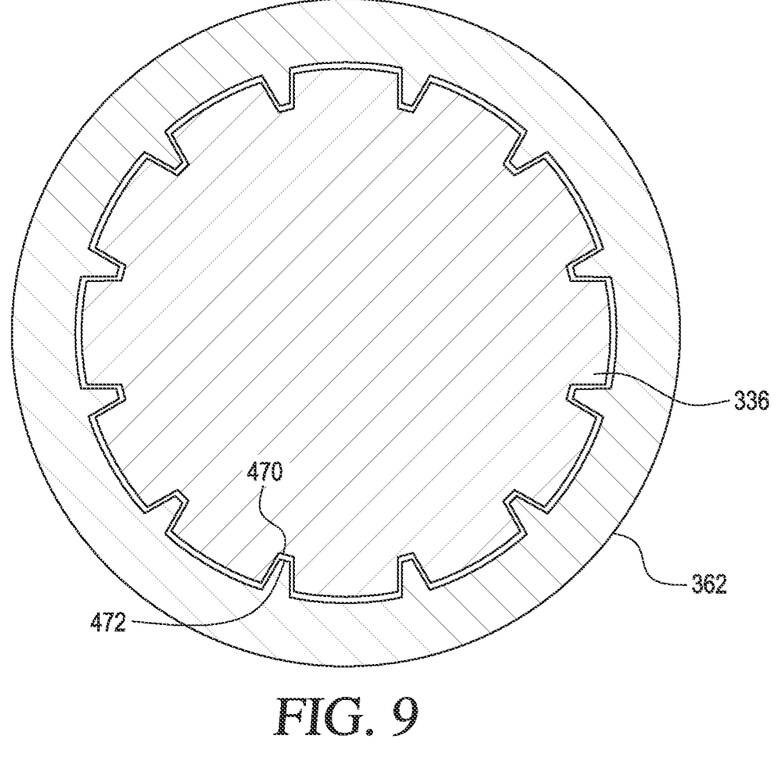
FIG. 9 is a cross-sectional view taken along line 6-6 in FIG. 3, showing a spline drive drill bit shank with a body structure fitted onto it.

The cross-section in FIG. 9, also taken along line 6-6 in box 360 (FIG. 3), similarly shows body structure 362 with an opening fitted over shank 336, illustratively a spline drive drill bit shank rather than an KCS drill bit shank. In the illustrated example, shank 336 has twelve open-ended slots (or, between them, twelve splines) of substantially equal size and shape, with slot 470 being representative, and no close-ended slots. The inward-facing surface of the opening is completely complementary, both to the end of shank 36 and also to shank 336 at the position of line 6-6 in box 360, because it has twelve splines (or, between them, twelve slots), with spline 472 being representative, and each spline is complementary to a respective open-ended slot in shank 336 (and each slot in the inward-facing surface is complementary to a respective spline in shank 336).

Each of the splines and slots in the inward-facing surface has side-to-side engagement with its respective slot or spline, e.g. spline 472 has side-to-side engagement with slot 470, and the inward-facing surface is therefore sufficiently engaged with the surface of shank 336 that manual rotary force is transferred from one surface to the other. As in FIGS. 4-6, however, the inward-facing surface of body structure 362 could be varied while maintaining sufficient engagement for transfer of manual rotary force. For example, the inward-facing surface could include only a subset of the splines or a subset of the slots and each remaining spline or slot could still have side-to-side engagement with a respective open-ended slot or spline of shank 336, and the surfaces might still be sufficiently engaged for transfer of manual rotary force.

Manual rotary force is transferred to a body structure or substructure in the variety of ways corresponding to respective embodiments or implementations of the invention. For example rotary force may be transferred in any of the ways illustrated in FIGS. 3 and 6-9. One general strategy is to provide manual rotary force to a body structure through one or more lever-like arms or handles in any suitable way.

Figure 10:
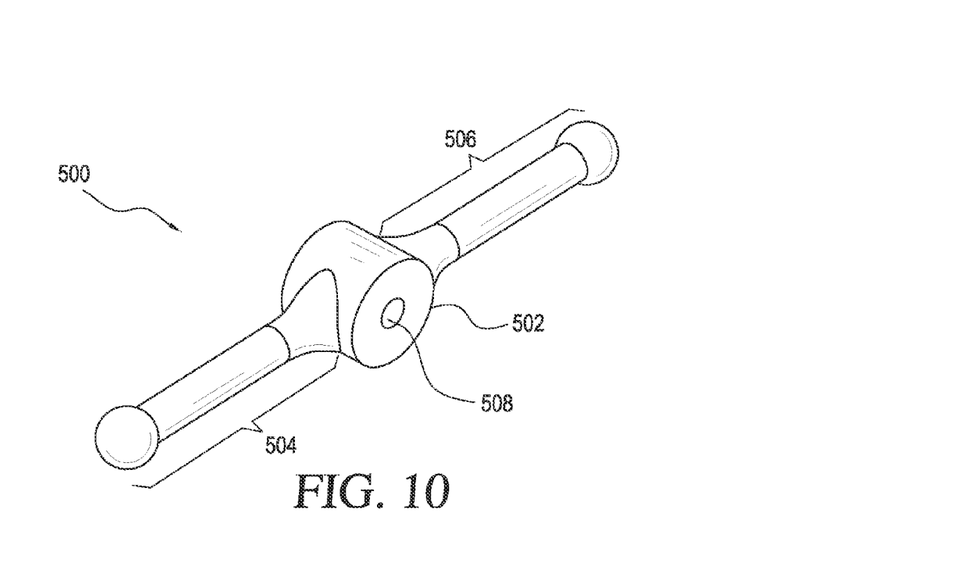
FIG. 10 is a perspective view of an exemplary complete tool implementation.
Figure 11:
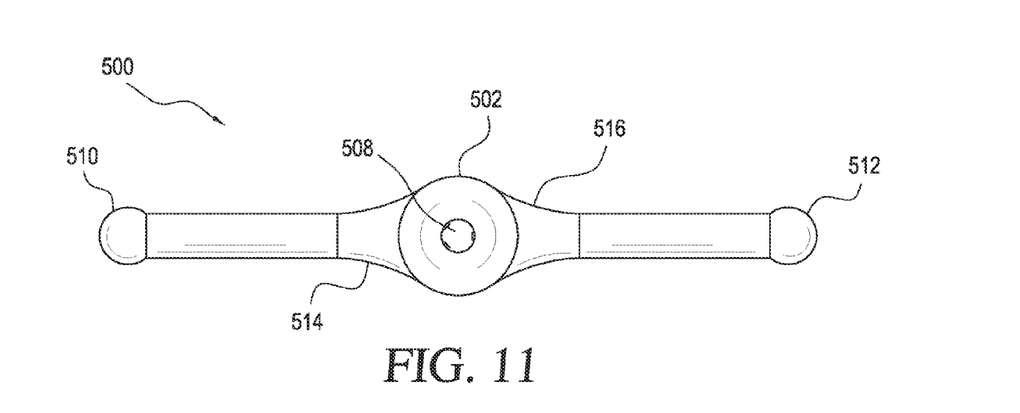
FIG. 11 is a side view of the implementation of FIG. 10.

Tool 500 in FIGS. 10 and 11 illustrates an exemplary complete tool implementation that includes body structure 502 and, attached to it, arms 504 and 506, each extending radially outward from body structure 502. A user can hold either or both of arms 504 and 506 at any desired position to exert appropriate leverage and can manually turn them to transfer rotary force through an inward-facing surface around opening 508 to a surface of a drill bit shank fitted into opening 508. Knobs 510 and 512 at the ends of arms 504 and 506, respectively, can assist the user in holding arms 504 and 506 and also provide smooth surfaces. Similarly, shoulders 514 and 506 provide smooth surface transitions between body structure 502 and arms 504 and 506, respectively.

Figure 12:
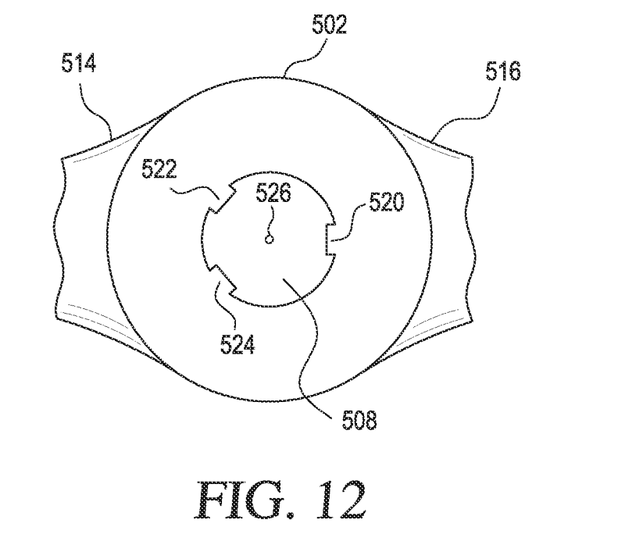
FIG. 12 is a detailed side view of the implementation of FIGS. 10 and 11.

FIG. 12 illustrates detailed features of an implementation of body structure 502 similar to body structure 362 as in FIG. 8. The inward-facing surface around opening 508 includes splines 522, 524, and 526, positioned and shaped to fit readily into open-ended slots in a drill bit shank such as a KCS drill bit shank. Each of splines 522, 524, and 526 extends longitudinally through opening 508, meaning that each spline is parallel to axis of rotation 526, an axis about which a drill bit shank fitted into opening 508 would rotate in response to manual rotary force.

Tool 500 as in FIGS. 10-12 could be manufactured in various ways from a variety of materials. For example, tool 500 could be a single-piece tool, machined from a single piece of tool steel or other suitable metal or cast as a single metal piece and then slightly machined if necessary. In other examples, arms 504 and 506 could be made separately from body structure 502 and then attached to body structure 502 in any appropriate way. For example, each of arms 504 and 506 could have a threaded end that can be screwed into a threaded hole in body structure 502. In further examples, tool 500 could be made from aluminum or other suitable metal, but with splines 522, 524, and 526 made from a harder metal such as steel with a hardened carbide surface and any other appropriate alloy. For example, splines 522, 524, and 526 could be removable keys in keyways in body structure 502 or a steel sleeve could first be fitted into the opening and removable carbide steel keys could then be inserted into the steel sleeve.

Figure 13:
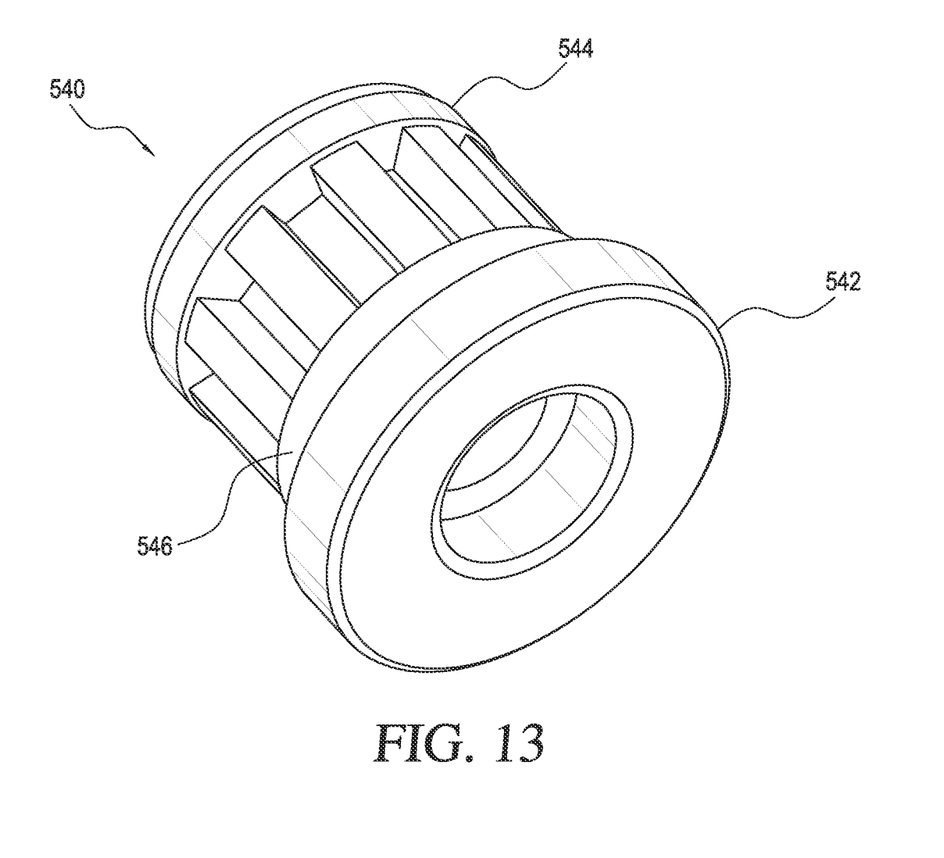
FIG. 13 is a perspective view of an exemplary drop in implementation.
Figure 14:
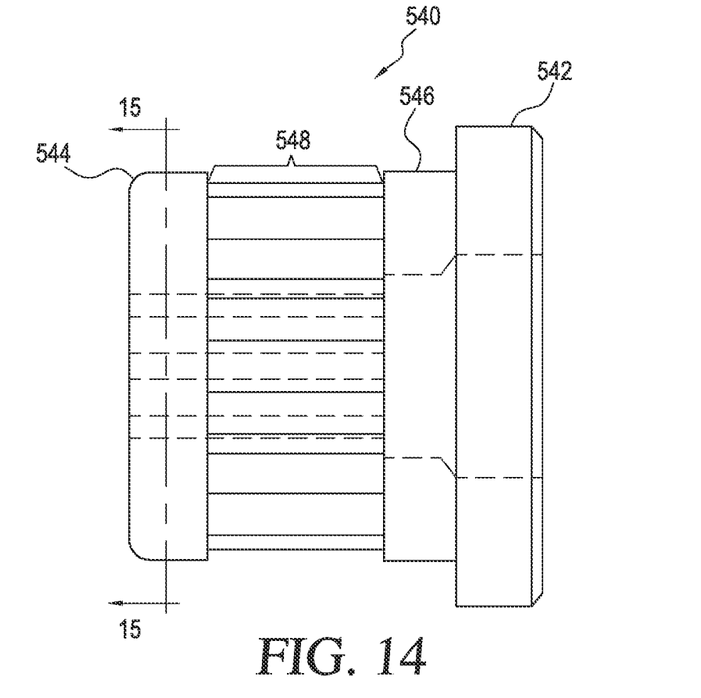
FIG. 14 is a side view of the implementation of FIG. 13.

Tool 540 in FIGS. 13 and 14 illustrates an exemplary drop in implementation that includes only a body structure 502 without attached arms or handles but structured so that it can be dropped into or otherwise inserted in a ratchet wrench or other wrench that holds it firmly and can be used to provide manual rotary force. A user can hold the wrench and manually turn it to transfer rotary force through an inward-facing surface to a surface of a drill bit shank fitted into an opening in tool 540. Collars 542, 544, and 546 are sized and shaped to hold tool 540 in place in the wrench after insertion, with collar 542 large enough to prevent tool 540 from falling through the wrench in a longitudinal direction while collars 544 and 546 provide surfaces that hold tool 540 in place radially. Ratchet interface 548 includes alternating splines and slots that are sized and shaped so that a ratchet wrench can engage interface 548 to transfer manual rotary force to the outward-facing surface of tool 540.

Figure 15:
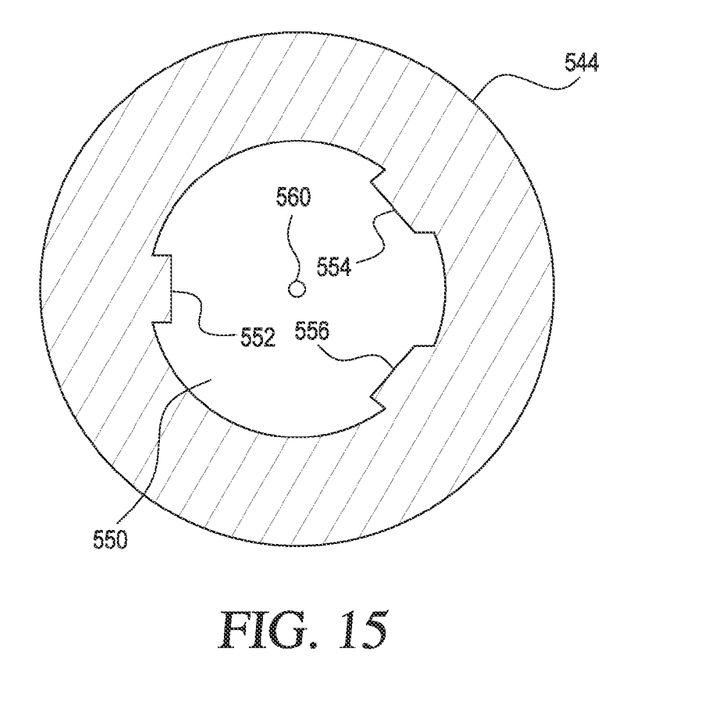
FIG. 15 is a cross-sectional view of the implementation of FIGS. 13 and 14, taken along the line 15-15 in FIG. 14.

FIG. 15 is a cross-section through collar 544, taken along line 15-15 in FIG. 14. The inward-facing surface around opening 550 includes splines 552, 554, and 556, positioned and shaped to fit readily into open-ended slots in a drill bit shank such as a KCS drill bit shank. Each of splines 552, 554, and 556 extends longitudinally through opening 550, meaning that each spline is parallel to axis of rotation 560, an axis about which a drill bit shank fitted into opening 550 would rotate in response to manual rotary force.

Tool 540 as in FIGS. 13-15 could be manufactured in various ways from a variety of materials, including those described above in relation to tool 500 in FIGS. 10-12. In particular, tool 540 could be a single-piece tool, machined from a single piece of tool steel or other suitable metal or cast as a single metal piece and then slightly machined if necessary. As with interior splines as described above, the exterior splines driven by a ratchet wrench could be hardened in any appropriate way. A prototype implementation similar to tool 540 in FIGS. 13-15 has been successfully produced by machining a single piece of metal. It was dropped into a ratchet wrench and successfully fitted onto a KCS drill bit. The ratchet wrench was then used to turn the drill bit counterclockwise as one would turn it to remove the drill bit from a hole it had produced.

Although the single-piece implementations illustrated in FIGS. 10-15 facilitate manufacture and have other advantages, it may be appropriate to provide additional features to improve on the illustrated implementations. For example, rather than splines, a body structure could include sliding balls or other additional parts that fit into open-ended or close-ended slots. More generally, features of existing drill chucks could be incorporated into a body structure, such as to hold a drill bit's shank more firmly. Along these lines, an exemplary manufacturing technique would be to produce a multi-part body structure with all desired features and then attach one or more arms or handles.

Techniques as described herein can be used in a variety of applications in which drilling is performed, including, for example, building, road, bridge, wall, or foundation construction; installation of wiring, plumbing, and so forth; demolition or repair of rock, concrete, or other masonry structures, and so forth.

Techniques as described herein can be advantageously implemented so that, for example, a removal tool can be quickly and snugly fitted onto a stuck drill bit's shank. Such a tool can efficiently apply manual force provided by a user so that energy is efficiently transferred, such as where the tool is well matched to the drill bit and little energy is required to dislodge the bit. Such a tool may not require any adjustment, and can reduce risk of damage to the bit and risk of slipping, which could otherwise cause injury to a user. Such a tool's effects can include increased user effectiveness, reduced time for drill bit removal, and increased safety.

The implementations described herein could be modified or varied in many different ways within the inventive scope of this application. For example, implementations as in FIG. 13-15 could be used with types of wrenches other than ratchet wrenches. A RIDGID® brand pipe threading tool could be used, for example. Also, implementations as in FIGS. 10-15 could be modified to use a crank-like handle, either attached to a body structure as in FIGS. 10-12 or fitted into an open end of a body structure in a way analogous to FIGS. 13-15.

Figure 16:
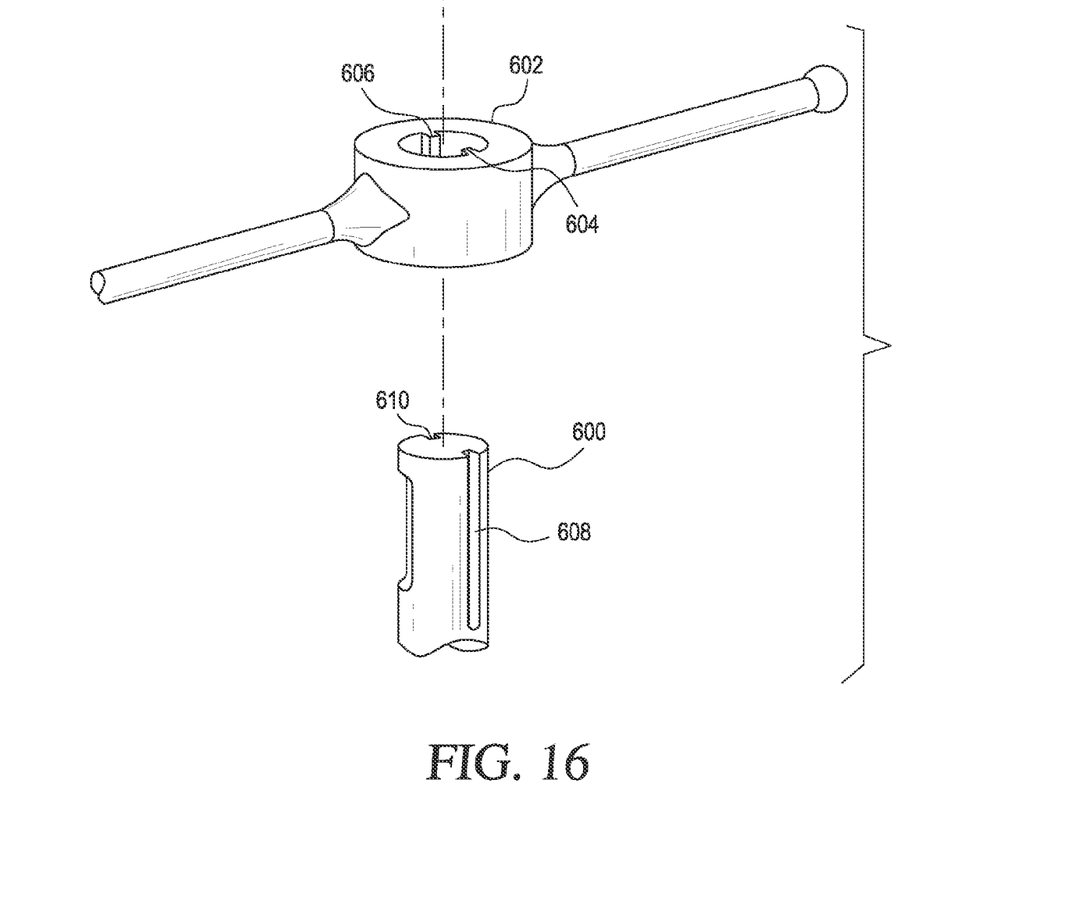
FIG. 16 is an exploded view showing the assembly of a slotted spline and tool according to certain aspects of the invention.

FIG. 16 shows an exploded view that illustrates the interaction of a slotted drill bit shank 600 with a removal tool 602 according to principles of the invention. As apparent in the exemplified arrangement, the splines 604, 606 of the removal tool 602 are adapted to fit within the corresponding grooves 608, 610 of the drill bit shank 600 as the drill bit is inserted into the bore in the body of the removal tool 602. In the illustrated tool 602, splines 604 and 606 are substantially rigid and integral to the body of the removal tool 602.

Figure 17:
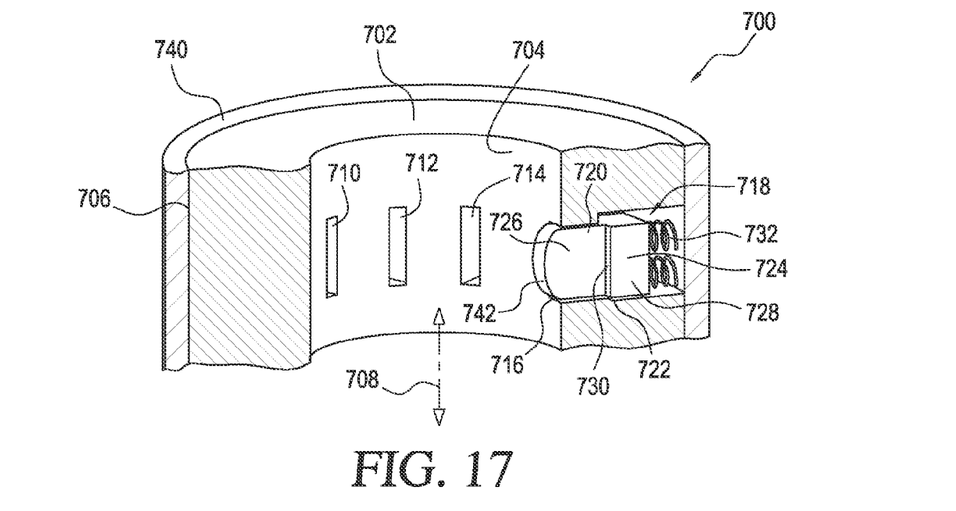
FIG. 17 shows a portion of an extraction device including a movable key prepared according to principles of the invention.

FIG. 17 shows a portion of a further extraction device 700 prepared according to principles of the invention. As suggested by the illustrated portion, the extraction device 700 includes a generally cylindrical body portion 702 having an inner circumferential wall 704 and an outer circumferential wall 706 disposed generally coaxially with respect to one another and respect to a longitudinal axis 708 of the extraction device 700.

A plurality of inner apertures, e.g., 710, 712, 714, 716 are disposed at the inner circumferential wall 704. Each of the inner apertures opens onto a respective cavity, e.g. 718 disposed radially between the inner aperture and a corresponding outer aperture at the outer circumferential wall 706.

Referring to the exemplary cavity 718, one sees that the cavity includes a first narrower portion 720 disposed relatively radially proximate to be longitudinal axis 708, and a second wider portion 722 disposed relatively radially distal to the longitudinal axis 708. A generally circumferential surface region between the narrower portion 720 and the wider portion 722 forms a shoulder of the cavity.

As illustrated by exemplary cavity 718, the radial cavity is adapted to receive a movable key 724 therewithin. The movable key 724 includes a first narrower portion 726 with a circumferential surface similar in shape and size to the narrower portion 720 of the radial cavity 718. The movable key 724 also includes a second wider portion 728 with a circumferential surface similar in shape and size to the wider portion 722 of the radial cavity 718. A surface region of the movable key 724 is disposed between the narrower portion 720 and the wider portion 722 to form a shoulder of the key 730. An elastic device 732 such as, for example, a spring is disposed radially outward of the movable key 724 and held in place within the cavity 718. In the illustrated embodiment, the elastic device 732 is held in place by an inner circumferential wall of a circumferential ring 740, although many other retaining devices and arrangements are possible.

The elastic device 732 urges the movable key 724 radially inward toward the delay. The movable key 724 is supported and guided in his motion by a sliding interface between its external surfaces and the corresponding internal surfaces of the radial cavity 718. At an inner extreme, this sliding motion is arrested by a radial interference between the shoulder 730 of the movable key 724 and the corresponding shoulder of the cavity. In this inward position, a portion of the key is adapted to reside within a corresponding groove of a KCS drill bit shank.

As illustrated, the portion of the key that extends beyond the inner circumferential wall 704 includes a surface 742 that is adapted to serve as a ramp to motivate displacement of the key radially outward against the urging of the elastic device 732 when the ramp encounters a circumferential surface of the drill bit shank, rather than a groove. As illustrated, the ramp can include a surface region that is curved in one or more dimensions. In alternate arrangements, a linear surface region, disposed at an oblique angle, may be included in the ramp and, in still other embodiments, combinations of linear and curved surfaces may be used to form an effective ramp.

Figure 18:
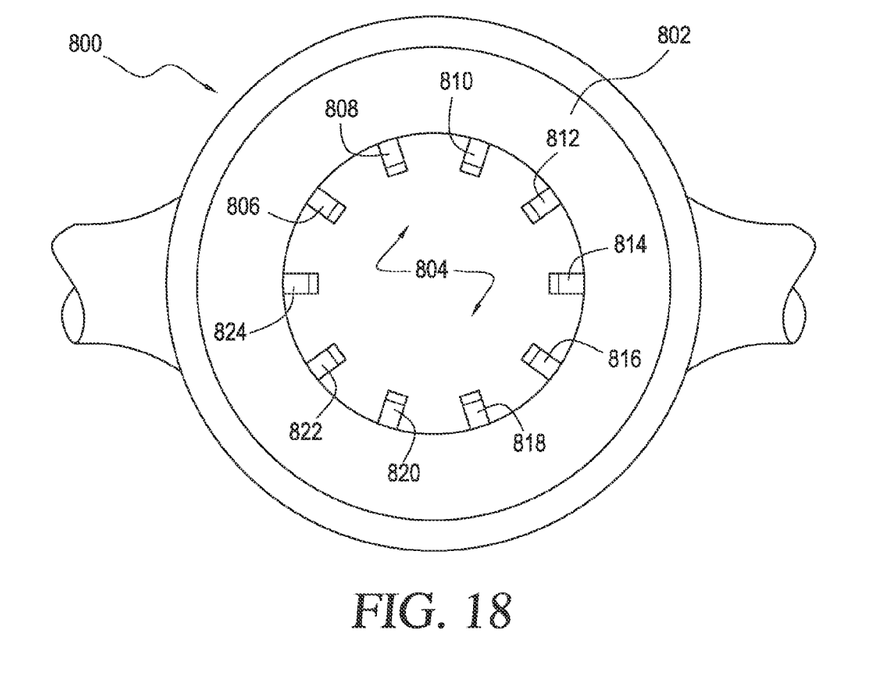
FIG. 18 shows a further aspect of extraction device including a plurality of movable keys prepared according to principles of the invention.

FIG. 18 shows a top view of an extraction tool 800. The extraction tool 800 includes a body portion 802 having a longitudinal bore 804. An exemplary plurality of movable keys 806, 808, 810, 812, 814, 816, 818, 820, 822 and 824 extend radially into the longitudinal bore 804. Each of the movable keys is functionally similar to that illustrated by movable key 724 of FIG. 17.

The practitioner of ordinary skill in the art will readily understand that different drill bit shanks of various configurations may be inserted into the longitudinal bore 804 of the extraction tool 800. Where a movable key, e.g. 808, encounters a groove in the drill bit shank, the movable key will remain extended radially inward within the groove because of the urging of an elastic device exemplified by elastic device 732. On the other hand, a movable key, e.g., 816 that encounters a region of the drill bit shank wear no groove is present, will be displaced radially outward against the urging of the corresponding elastic device. By the prudent placement of movable keys around the inner periphery of a bore 804, an extraction device 800 may be prepared which is readily utilized in the extraction of a variety of drill bits, each having a different shank profile. Consequently, such a device will exhibit an advantageous versatility as compared to the static devices discussed above.

It should be understood, that the configuration and arrangement of illustrative movable keys are merely exemplary of many possible arrangements that will be evident to one of ordinary skill in the art in light of the present disclosure. For example, illustrated keys embody a generally rectangular cross-sectional profile, whereas a wide variety of other cross-sectional profiles are possible including, for example without limitation, circular, elliptical, square and triangular profiles. In addition, the mechanisms for urging the corresponding key radially inward can be any of a wide variety of mechanisms that fall within the scope of the invention. Thus, in certain embodiments, a mechanical mechanism is provided to positively displace a particular key or set of keys inwardly according to a particular setting entered by rotating the external caller 740 or otherwise adjusting a mechanism. Furthermore, where an elastic device is desirable, that elastic device may include any of a metallic device, an elastomeric polymer device, a pneumatic device, a hydraulic device (and any combination thereof) or any other device or arrangement suitable to urge the movable key in the desired direction.

An extraction device such as that illustrated in FIG. 18 can be manufactured by beginning with a blank formed of any appropriate material. A longitudinal bore 804 can be formed within the blank. A plurality of radial cavities exemplified by cavity 718 can also be formed within the blank. For example, a first smaller diameter hole can be drilled, or otherwise machined, radially within the blank from the outer circumferential surface (e.g., 706) all the way through the inner circumferential surface (e.g., 704). A second larger diameter hole can then be drilled, or otherwise machined, radially within the blank from the outer circumferential surface partway towards the inner circumferential surface, so as to form the desirable shoulder of the aperture. Thereafter, a movable key having a surface configuration similar to the radial cavity can be inserted inwardly into the radial cavity. Subsequently, an elastic device is inserted to retain the movable key and urge it inward. Thereafter, a retaining device is applied to retain the elastic device in place. In the illustrated embodiment of FIG. 18, for example, a retaining ring such as 740 is slid axially over the prepared assembly and held in place by a friction fit, by welding, by adhesive, by a fixturing device (e.g., a screw, rivet, etc.), or by any other appropriate mechanism.

In other embodiments of the invention, an extraction device is adapted to be rotatably coupled to a drill bit chuck so that handles can be attached and activated without removing the drill bit from the chuck. In still other embodiments, the chuck itself can include a mechanism adapted to support a radial lever handle so that the chuck itself can serve as an extraction device.

While the invention has been described in detail in connection with the presently preferred embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Accordingly, the invention is not to be seen as limited by the foregoing description, but is only limited by the scope of the appended claims.

The invention claimed is:
1. An article of manufacture comprising:
 a KCS rotary hammer drill shank comprising a coupling section including a plurality of open-ended slots running parallel to an axis of rotation of said shank defining an extraction structure, said extraction structure comprising:
a body substructure having:
   an opening having at least a first portion adapted to fit onto said KCS rotary hammer drill shank coupling section, wherein said first portion comprises an inward-facing surface around the opening, the inward-facing surface is adapted to fit on and slide down said shank with a slideable fit, wherein said inwardly facing surface further comprises a plurality of inward-facing surface having a plurality of apertures, said body substructure further comprising a plurality of spaced apart cavities formed in said body substructure each radially extending away from a center said opening through said body substructure;
   a plurality of spring loaded splines each comprising a spring and spline disposed in said plurality of spaced apart cavities where each of said spring loaded splines are configured as laterally moveable splines respectively extending out of said plurality of apertures, wherein some of said splines are respectively biased by said springs to retract or extend such that said splines can extendably fit into at least two of said open-ended slots; and
   one or more arm substructures extending radially outward from the body substructure adapted to and formed from a material which permits application of a rotary force through the inward-facing surface to the KCS rotary hammer drill shank or coupling section by application of said rotary force through said splines.

2. A method of using the article of claim 1 with the KCS drill bit stuck in a hole drilled in an object, the method comprising:
   placing said extraction structure onto said shank and turning said shank extraction structure in a first rotary direction, fitting the opening in the body substructure onto a KCS drill bit's shank;
   rotating said body on said shank until said at least two said splines slideably inserts and engages into at least two said open ended slots due to bias of said springs; and
   manually turning at least one of the arm substructures in a second rotary direction opposite the first rotary direction to withdraw the KCS drill bit.

3. The method of claim 2, further comprising, before the act of fitting the opening onto the KCS drill bit's shank:
   rotating in a first direction said KCS drill bit shank and applying a forward hammer force to said KCS drill bit with a drill configured to rotate said KCS drill bit only in said first direction;
   removing a KCS drill's chuck coupled to said drill from the KCS drill bit's shank, the KCS drill being non-reversible.

* * * * *